(12) United States Patent
Howsam

(10) Patent No.: US 7,275,927 B2
(45) Date of Patent: Oct. 2, 2007

(54) MULTI-CHANNEL COOLING DIE

(75) Inventor: Stuart Howsam, Wodonga (AU)

(73) Assignee: Mars, Inc., McLean, VA (US)

(*) Notice: Subject to any disclaimer, the term of this patent is extended or adjusted under 35 U.S.C. 154(b) by 196 days.

(21) Appl. No.: 10/482,934

(22) PCT Filed: Jul. 5, 2002

(86) PCT No.: PCT/AU02/00899

§ 371 (c)(1),
(2), (4) Date: Aug. 3, 2004

(87) PCT Pub. No.: WO03/004251

PCT Pub. Date: Jan. 16, 2003

(65) Prior Publication Data
US 2004/0247760 A1 Dec. 9, 2004

(30) Foreign Application Priority Data
Jul. 6, 2001 (AU) .................................. PR6219

(51) Int. Cl.
B29C 47/12 (2006.01)
B29C 47/86 (2006.01)

(52) U.S. Cl. ................. 425/378.1; 425/326.1

(58) Field of Classification Search ............. 425/378.1, 425/326.1
See application file for complete search history.

(56) References Cited

U.S. PATENT DOCUMENTS 3,461,496 A * 8/1969 Winstead .................... 425/4 R
3,857,665 A * 12/1974 Kennedy ................. 425/378.1

(Continued)

FOREIGN PATENT DOCUMENTS

JP 06-062821 3/1994

(Continued)

OTHER PUBLICATIONS

Cheftel, J.C., Kitagawa, M, and Queguiner, C.., "New Protein Texturization Processes by Extrusion Cooking at High Moisture Levels", Food Reviews International, 8(2), 235-275 (1982).

(Continued)

Primary Examiner—Yogendra N. Gupta
Assistant Examiner—Emmanuel S. Luk
(74) Attorney, Agent, or Firm—Fulbright & Jaworski LLP; Jan K. Simpson

(57) ABSTRACT

A cooling die, for use in the manufacture of extruded food products, the cooling die including: a plurality of core members forming a main body portion of the cooling die between die inlet and outlet ends and arranged about an axis of the die in neighboring relationship; a plurality of extrudate flow channels extending through the cooling die from the inlet end to the outlet end, defined by gaps between neighboring ones of said core members; at least one bore in each said core member through which coolant may flow; an enclosing structure adapted to secure the core members against radial movement relative to the die axis; means for connecting the cooling die to an outlet of a food extruder, a cooling fluid source and a cooling fluid receptacle; and extrudate flow distribution means, located adjacent the inlet end, adapted to direct extrudate from the outlet of the food extruder into selected ones of said extrudate flow channels.

9 Claims, 2 Drawing Sheets

U.S. PATENT DOCUMENTS

| | | | |
|---|---|---|---|
| 4,138,208 A * | 2/1979 | Heckeroth | 425/71 |
| 4,614,489 A * | 9/1986 | Juravic | 425/376.1 |
| 5,261,988 A * | 11/1993 | Dikis et al. | 156/244.13 |
| 6,802,996 B2 * | 10/2004 | Tsuruta et al. | 264/40.6 |
| 2001/0005516 A1 | 6/2001 | Yoshii | |

FOREIGN PATENT DOCUMENTS

| | | |
|---|---|---|
| JP | 06-082821 | 3/1994 |
| WO | WO-98/03323 A1 | 1/1998 |
| WO | WO-00/69276 A1 | 11/2000 |
| WO | WO-01/49474 | 7/2001 |

OTHER PUBLICATIONS

Cheftel, J.C., Kitagawa, M, and Queguiner, C.., "New Protein Texturization Processes by Extrusion Cooking at High Moisture Levels", Food Reviews International, 8(2), 235-275 (1982).

* cited by examiner

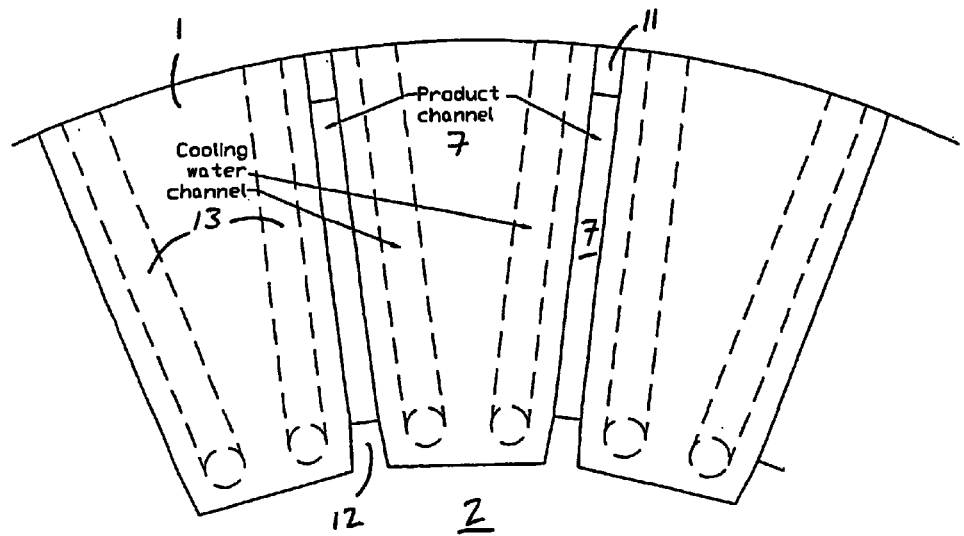
Figure 3
Figure 4
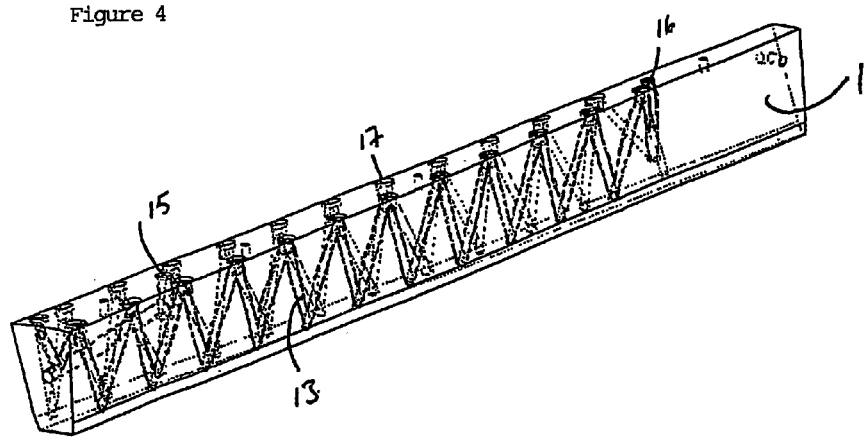

MULTI-CHANNEL COOLING DIE

CROSS-REFERENCE TO RELATED APPLICATIONS

This application is a national stage filing of PCT/AU02/00899 filed Jul. 5, 2002, claiming priority to Australian Application No. PR6219 filed Jul. 6, 2001.

TECHNICAL FIELD

This invention relates to cooling dies for use in association with food extruders in the manufacture of texturised protein food products.

In particular, the present invention relates to a cooling die for use in the manufacture of an extruded food product that has the appearance of fibrous meat pieces such as fish, chicken, lamb or beef. The cooling die is attachable to the outlet of an extruder which may contain one or more screws and feeds molten extrudate to said cooling die at a temperature between 110° and 180° C.

BACKGROUND OF THE INVENTION

Various protein texturisation processes have been used for some time in the manufacture of various food products, such as in the manufacture of sausages, kamaboko, meat analogs and seafood analogs. A fibrous texture may be obtained by various means, including extrusion cooking at low moisture levels (typically 10-30% by weight). Extrusion cooking at high moisture levels (e.g. typically 30 to 80% water by weight) is a relatively new technique, which is finding use mainly in the field of texturization of protein food products.

High moisture extrusion cooking has been discussed as a means of restructuring various natural protein sources, such as fish mince, surimi, de-boned meats, soy flours, concentrates, cereal flours, dairy proteins and the like, in order to obtain cohesive fibrous or lamellar structures (e.g. see "New Protein Texturization Processes by Extrusion Cooking at High Moisture Levels" by J C Cheftel et al, Food Reviews International, 8 (2), 235-275 (1992) published by Marcel Dekker, Inc.).

Unlike low moisture extrusion cooking, high moisture extrusion cooking requires the use of cooling dies for cooling, gelling and/or solidifying the food extrudate issuing from the food extruder. A cooling die dissipates the thermal and mechanical energy accumulated in the food mix, increases the viscosity of the mix, and prevents extrudate steam flash at the die outlet which would cause unwanted expansion of said extrudate.

Three main types of cooling dies are known for use in this field of technology/application. Most commonly known are elongated rectangular or cylindrical cooling dies, with a rectangular or cylindrical duct extending along the length of the die. The regions surrounding the duct are cooled with water thereby enabling the extruded food product passing through to be cooled. There are also annular cooling dies in which the internal cavity has an annular cross-section defined by an inner core and an outer cylinder. The inner core and outer cylinder are cooled, thereby enabling the food product passing through the cavity to be cooled.

There are also known multi-channel (or duct) cooling dies where the extrudate exiting the extruder is 'split' and made to flow into a number of individual cooling ducts disposed about a longitudinal axis of the die such that individual strands of solidified, textured product are delivered at the cooling die outlet.

Thus, multi-channel cooling dies have the potential for increased throughput without adversely affecting the product's characteristics and increasing the cooling time, which would be the result of using a single duct die with an increased cross-sectional area.

Attempts have also been made to increase the capacity of cooling dies through the use of higher flow rates with single-duct cooling dies of greater cross-sectional areas. This measure necessitates longer cooling dies. This has a number of adverse consequences. For instance, longer cooling dies increase the likelihood of inconsistencies arising in the food product and structure blockages occurring in the cooling die. Also, such dies obviously take up more area or floor space of the production plant, which in turn increases costs.

Japanese patent application No. 4-214049 (publication no. 6-62821) discloses a multi-channel cooling die which is used in the extrusion of thin, thread-like food products from high moisture content proteinaceous raw materials. The cooling die is essentially constructed like a typical shell-and-tube heat exchanger, wherein the shell covers at the axial ends of the cylindrical shell are replaced with purpose built end plates. The inlet end plate is flanged to the extruder's die plate holder, while the other end plate is similar in layout to the stationary tube sheet of the heat exchanger, i.e. a multiple-orifice plate in which the ends of the plurality of inner tubes are wedged and supported.

The plurality of thin-walled inner tubes employed in such type of cooling die ensures efficient cooling at higher throughput rates of extrudate. It is said that the individual tubes possess high pressure resistance thereby enabling processing of greater amounts of raw materials as compared with conventional, single cavity cooling dies.

One shortcoming of this type of cooling die is the need to use implements such as long rods for cleaning the individual inner tubes through which the extrudate flows during processing. The smooth surface of the tubes can be damaged during the cleaning process (due to their length), which may result in irregular loading of individual tubes from the extruder as a consequence of increased surface roughness (and back pressure) at individual tubes. Also, where one of the tubes is damaged to an extent that it no longer provides a flow path for the molten extrudate, it may be necessary to replace the entire cooling die or individual tubes. The replacement process is potentially time-consuming and labour intensive, as the individual tubes are received in airtight manner at the end plates of the cylindrical shell. Therefore, all tubes have to be removed and refitted in order to exchange any one of them.

Patent Application PCT/AU01/00011, in the name of Effem Foods Pty Ltd discloses a cooling die for use with a food extruder, which enables greater manufacturing output without substantially increasing the cross-sectional area or length of the extrudate flow cavity, when compared to single cavity cooling dies used in the art, by providing a multi-channel cooling die which addresses some or all of the disadvantages perceived to exist with shell-and-tube type cooling dies. The cooling die body consists of a number of stacked plate elements, which are braced together. Each plate has through-holes, which align with corresponding through-holes of adjacent plates thereby to define multiple product flow channels (ducts) and coolant flow channels. However there are some disadvantages associated with this particular design, outlined as follows:

Coolant Flow

In the stacked plate cooling die assembly, coolant flows through a number of ducts that are formed when the required number of die-core elements are bolted together. The diameter of these channels varies according to the radial position thereof from the longitudinal axis of the die. The design is chosen such that the distance between the coolant channels and the product channels remains constant over the entire cross-section of the die. However, it also means that the outer cooling channels will have the higher coolant flow rate. Unless additional coolant flow restriction elements are employed to achieve constant and equivalent flow through all cooling medium channels, such design will have adverse consequences for product quality and consistency, product exiting the cooling die would tend to be heterogeneous with the portion of product closer to the center of the cooling die being slightly more expanded (due to poorer cooling) than the product further from the center. Product also will occasionally twist due to a velocity gradient from inner to outer radius of the product channels. In addition to this, uneven heat transfer can result in some product channels running more slowly than others. This results in product passing through the cooling die at various residence times. Some product may therefore be over expanded while other product is not sufficiently expanded. An example of operational difficulties that may arise due to this effect is that the flow in some channels may stop completely while the flow in the others increases to an extent where it does not receive adequate cooling, adversely affecting product quality.

Product Flow From Extruder to Die

Product flow from extruder to die plays a very important role in cooling die stability. It is important for the average flow path from extruder outlet to cooling die product inlet to have as small a standard deviation as possible. Alternatively, the difference between the shortest path and longest path from extruder to cooling die channel inlet should be as small as possible. Large differences have been found to exacerbate the creation of dead spaces in the transition piece between the extruder outlet and cooling die inlet. This in turn leads to the development of burnt product that can lead to downgraded product or blocked primary die holes.

Die Assembly & Cleaning

As noted above, the cooling die disclosed in PCT/AU01/00011 consists of a number of plates; stacked together to form the cooling die body, in which are formed a plurality of product flow channels and adjacent coolant channels. In a typical configuration, 20 plates are used. A disadvantage associated with this form of construction is that assembly of this die time-consuming, and requires significant operator skill to position all the plates correctly and tension the clamping bolts. Dismantling of the cooling die for cleaning purposes may also take significant time, particularly if the product remaining in the cooling die at the conclusion of a run solidifies in the channels, effectively bonding the plates together. Such solidified product may potentially be difficult and time-consuming to remove. Consequently, turnaround times for this type of cooling die may be up to about 4 hours. There are significant advantages associated with reducing this turn-around time.

Running Cost

The cooling die design disclosed in PCT/AU01/00011 relies on direct contact between adjacent plates to seal both the extrudate and coolant channels, unless additional seal elements are used at each channel joint or interface. Slight wear on the surfaces of the plates could result in extrudate leaking into coolant channels, or to the outside, or coolant leaking into extrudate channels, or to the outside. Even small levels of leakage create quality or stability problems and so damaged plates are replaced regularly.

BRIEF SUMMARY OF THE INVENTION

An object of the present invention is to find alternative cooling die design solutions which address some, and preferably all, of the above described shortcomings in prior art multi-channel cooling dies devised for food extrusion purposes.

In accordance with a first aspect of the present invention there is provided a cooling die, for use in the manufacture of extruded food products, said cooling die including:

a plurality of core members forming a main body portion of the cooling die between die inlet and outlet ends and arranged about an axis of the die in spaced-apart relationship;

a plurality of extrudate flow channels extending through the cooling die from the inlet end to the outlet end, defined by gaps between adjacent ones of said core members;

at least one bore in each said core member through which coolant may flow;

an enclosing structure adapted to secure the core members against radial movement relative to the die axis;

means for connecting the cooling die to an outlet of a food extruder, a cooling fluid source and a cooling fluid receptacle; and extrudate flow distribution means, located adjacent the inlet end, adapted to direct extrudate from the outlet of the food extruder into selected ones of said extrudate flow channels.

The individual core members may preferably extend for substantially the length of the die and may preferably be distributed radially around a central core member.

The core members radially arranged around the central core member may all preferably have a wedge- or truncated-sector-like shape in cross section, such as to enable the extrudate channels that are defined between each two neighboring members to maintain a constant width. Equally advantageous is shaping of the radial core members along their extension along the longitudinal axis of the die so that they "splay" along the longitudinal axis of the main body portion in the direction of extrudate flow, ie the radial dimension of the radial core members increases from inlet towards outlet end of the die. Such splaying effectively reduces the variation in extrudate path length between the extruder and the cooling die, promoting more consistent flow in each of the cooling die channels.

Each core member preferably includes one or two coolant channels of constant cross-section that extend the length of the core member. Each extrudate channel has two corresponding coolant channels, one each side of the extrudate channel. The advantage of this design is that only two coolant channels (one on each side) cool the entire extrudate channel and, as long as the coolant is distributed to each cooling channel evenly, heat transfer from extrudate to coolant will be constant in the radial direction. Even coolant distribution to each channel is assured by designing the coolant distribution plenum area to be large in comparison with the total cross-sectional area of the coolant channels.

Preferably, the coolant channel pathway along each side of the core member is in the form of a 'zig-zag' pattern that alternates between the upper and lower sides of the core member as it runs from one end of the core member to the other. Preferably the coolant enters one end of this channel from a coolant distribution plenum, and flows continuously through the channel to a coolant outlet plenum.

The invention provides extrudate flow channels that are angled outward in relation to the axial center-line of the die. The present invention thereby addresses the limitation of the prior art in providing even extrudate flow across all channels by ensuring minimal product path length variation. The present invention provides that the pitch circle diameter (PCD) of the extrudate channels at the inlet of the cooling die is smaller than the PCD at the die outlet. This difference in PCD may preferably be about 30%. This design reduces extrudate flow path average distance and standard deviation when compared with the prior art, and allows for reduced operational downtime due to blocked primary die-holes.

The present invention provides a cooling die assembly that is substantially simpler to assemble than the 'stacked plate' assemblies described in the prior art. The cooling section of the cooling die according to the present invention features a main housing (into which the smaller core members are bolted), a central cone, and an end plate. Assembly of the cooling die according to the invention is performed by first inserting the center cone into the main housing and then bolting on the end plate. This stage may be carried out in approximately 10 minutes. Dismantling is equally simplified. At the conclusion of a production run, the end plate is removed followed by the center cone. A special cone removal device may preferably be supplied to simplify this task even further. Any remaining extrudate in the die can then be easily removed using high-pressure water or, if extrudate is too hard for water to be effective, a suitable tool may be provided to remove hard extrudate.

This task is simplified in the present invention because one entire side of the extrudate channel is removed when the inner cone is taken out. This means that the extrudate is not constrained on all sides by the die itself, allowing easy insertion of cleaning tools.

The cooling die according to the present invention provides greater physical isolation between the extrudate and coolant flow channels than the 'stacked plate' designs of the prior art. Therefore, physical wear of the various components of the cooling die is significantly less likely to allow e.g. cross-contamination between the extrudate and the coolant. This means that parts can endure significantly more wear without impacting product quality or die integrity. The running cost of the die according to the present invention is therefore likely to be significantly lower.

Preferably, one cooling water channel cools the entire length of one side of the product channel. The result is significantly improved evenness of heat transfer and hence product quality.

According to a second aspect of the present invention, there is provided a cooling die, for use in the manufacture of extruded food products, said cooling die including:

a plurality of core members forming a main body portion of the cooling die between die inlet and outlet ends and arranged about an axis of the die;

at least one bore in each said core member through which extrudate may flow;

at least one bore in each said core member through which coolant may flow;

an enclosing structure adapted to secure the core members against radial movement relative to the die axis;

means for connecting the cooling die to an outlet of a food extruder, a cooling fluid source and a cooling fluid receptacle;

and extrudate flow distribution means, located adjacent the inlet end, adapted to direct extrudate from the outlet of the food extruder into selected ones of said extrudate flow channels.

A preferred embodiment of the invention is described below with reference to the accompanying drawings and by way of example only. Further advantages and preferred features of the invention are discussed there also.

BRIEF DESCRIPTION OF THE DRAWINGS

FIG. 3 is a detail view of the cross section of FIG. 2, showing the positioning of the coolant flow channels in one of the cooling wedges.

FIG. 4 is an isometric view of one of the cooling wedges, showing the internal flow path of two coolant channels.

DETAILED DESCRIPTION OF THE INVENTION

In order to produce extruded food products, such as fibrous meat analogues, one requires an extruder with the ability to impart shear and pressure on the ingredient formulation and convey said material to the cooling die. The extruder may contain one or more screws. These are well known and will not be described here.

Figure 1:
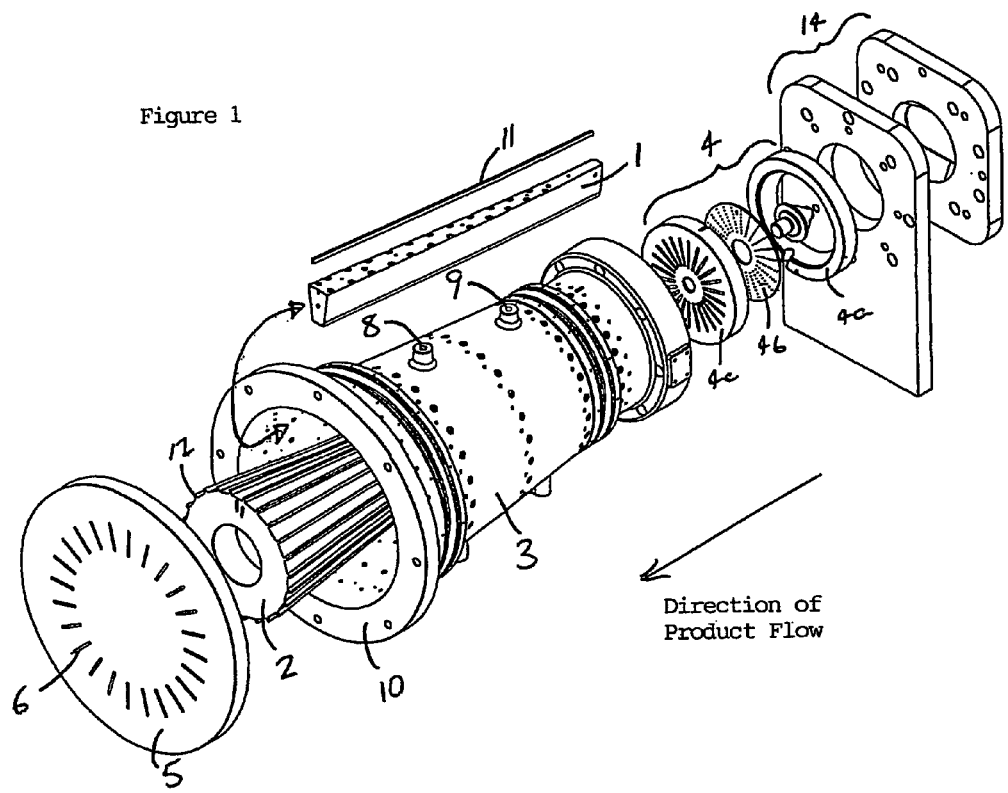
FIG. 1 is an exploded isometric view of the major components of a cooling die conforming to a preferred embodiment of the invention, showing only one of 24 cooling wedges outside of the housing structure.

A cooling die assembly, in accordance with the invention, for use at the delivery end of a high moisture proteinaceous food extruder, is shown in an exploded isometric view in FIG. 1. The die assembly essentially comprises a multi-piece die body consisting of a plurality of cooling wedges 1 that are arranged radially around a central core 2. This arrangement is encased within a tubular restraining sheath 3. Extrudate flow is directed into the inlet end of the die from the extruder via a flow distribution device 4, consisting of a diverging cone 4a, a holeplate 4b and a slotted plate 4c. The distribution device 4 is designed to ensure even extrudate flow into all extrudate flow channels 7. A die-plate 5 is bolted on to a flange 10 at the outlet end of the cooling die, to restrain the internal structure from being pushed out of the sheath 3 by the pressure of extrudate flow. The end-plate 5 features extrudate flow orifices 6 in positions that correspond with each of the extrudate flow channels running through the die, and are given a profile that corresponds with the desired profile of the product stream as it exits the die. The restraining sheath features inlet 8 and outlet 9 points for the flow of coolant to and from the coolant inlet and outlet plenums that form an annular cavity within the sheath 3. Spacer strips 11 are provided in between each cooling wedge 1 and the inner surface of the sheath 3 to ensure correct positioning of adjacent cooling wedges 1. Spacing ridges 12 run along the length of the central core 2, also to ensure correct positioning of adjacent cooling wedges 1.

Figure 2:
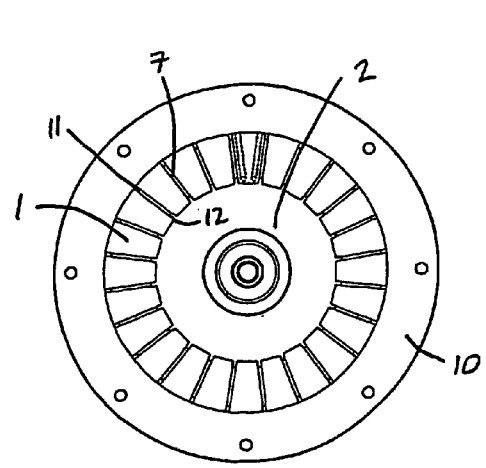
FIG. 2 is a cross-sectional view of the fully assembled cooling die.

Twenty-four extrudate flow channels 7 extend axially between the inlet end of the die and the outlet end thereof. These channels will typically be rectangular in cross-section. The cross-sectional view of FIG. 2 shows how the extrudate flow channels 7 are defined by the side-walls of the cooling wedges 1 on a first and second long side, on a third short side by the spacer strips 11 and on the fourth short side by the spacing ridges 12.

The coolant channel 13 flow path is contained within the individual cooling wedges 1. These flow paths can be seen as dotted lines in the detail view of FIG. 3, and as dotted lines in FIG. 4. The coolant channels 13 can be seen to run in a 'zig-zag' pattern along the length of the cooling wedge 1. The coolant enters the cooling wedge 1 through coolant inlet orifice 15, flows through the coolant channel 13 and exits from the cooling wedge 1 via coolant outlet orifice 16. The circular indentations 17 that appear along the top surface of the cooling wedge 1 are not orifices. They are merely sealed holes that are present as an artefact of the process used to manufacture the coolant path 13 in the cooling wedge 1.

It will be noted from FIG. 1 that the diameter of the sheath 3, the diameter of the central core 2 and the radial height of the individual cooling wedges 1 all increase from the inlet to the outlet end of the cooling die. However, the width of the extrudate flow channels 7 remain constant. This configuration allows substantially easier assembly and dis-assembly of the die, whilst maximising heat transfer from the extrudate. This 'splaying' of the extrudate flow paths also effectively reduces the variation in extrudate path length between the extruder and the cooling die, reducing variations in extrudate flow through each of the cooling die extrudate channels.

The major dimension or width of the extrudate flow channels 7 extends in a substantially radial direction from the central axis of the cooling die. The twenty-four extrudate flow channels 7 are equidistantly spaced from one another.

In use of the production facility, molten lava (i.e. extrudate) from the extruder flows through extruder outlet into attachment flange piece 14 and through the extrudate distribution device 4 before entering the cooling die extrudate flow channels 7. The flow of extrudate is evenly distributed over all extrudate channels 7 due to all extrudate paths being of similar lengths. The extrudate is then conveyed along the extrudate flow channels 7 formed by adjacent individual cooling wedges 1 exiting the cooling die via the end-plate 5. The total number of cooling wedges 1 may be varied according to the heat transfer area required for the specific extrudate. Thermocouples may be inserted into the cooling die at specially prepared points if required, to control the process.

What is claimed is:

1. A cooling die, for use in the manufacture of extruded food products, said cooling die comprising:
   a plurality of wedges forming a main body portion of the cooling die between die inlet and outlet ends and arranged about an axis of the die in neighboring relationship;
   a plurality of extrudate flow channels extending through the cooling die from the inlet end to the outlet end, defined by gaps between neighboring ones of said wedges;
   at least one bore in each said wedge through which coolant may flow;
   an enclosing structure adapted to secure the wedges against radial movement relative to the die axis;
   means for connecting the cooling die to an outlet of a food extruder, a cooling fluid source and a cooling fluid receptacle; and
   extrudate flow distribution means, located adjacent the inlet end, adapted to direct extrudate from the outlet of the food extruder into selected ones of said extrudate flow channels.

2. The cooling die according to claim 1, wherein the individual wedges extend for substantially the length of the die.

3. The cooling die according to claim 1, wherein the individual wedges are distributed radially around a central core member.

4. The cooling die according to claim 3, wherein the wedges radially arranged around the central core member all are wedge- or truncated-sector-like shaped in cross section, and wherein the extrudate channels that are defined between each two neighboring radially arranged wedges have a constant radial extension and a constant width in peripheral extension.

5. The cooling die according to claim 3, wherein the radially arranged wedges have a radial dimension that increases from cooling die inlet towards cooling die outlet such that they splay along their extension along the longitudinal axis of the die in the direction of extrudate flow.

6. The cooling die according to claim 1, wherein each wedge includes one or more coolant channels of constant cross-section that extend the length of the wedge.

7. The cooling die according to claim 4, wherein each extrudate channel has at least two coolant channels associated therewith, said channels being arranged such that one coolant channel is located on each side of each extrudate channel.

8. The cooling die according to claim 7, wherein the coolant channel pathway along each radial wedge is in the form of a zig-zag pattern that alternates between the radially upper and lower sides of the radial wedge as it runs from one longitudinal end of each radial wedge to the other.

9. The cooling die according to claim 8, wherein a coolant distribution plenum is disposed at the inlet end of the cooling die from where the coolant enters one end of an individual coolant channel from, and wherein a coolant outlet plenum is disposed at the outlet end of the cooling die to receive the coolant from the individual coolant channels.

* * * * *